US009926481B2

(12) United States Patent
Galindo et al.

(10) Patent No.: US 9,926,481 B2
(45) Date of Patent: Mar. 27, 2018

(54) POLYMERIC VISCOSIFIERS FOR USE IN WATER-BASED DRILLING FLUIDS

(71) Applicant: Halliburton Energy Services, Inc., Houston, TX (US)

(72) Inventors: Kay Ann Galindo, Montgomery, TX (US); Weibin Zha, The Woodlands, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/021,234

(22) PCT Filed: Mar. 31, 2015

(86) PCT No.: PCT/US2015/023565
§ 371 (c)(1),
(2) Date: Mar. 10, 2016

(87) PCT Pub. No.: WO2016/159975
PCT Pub. Date: Oct. 6, 2016

(65) Prior Publication Data
US 2018/0010031 A1    Jan. 11, 2018

(51) Int. Cl.
*C09K 8/12* (2006.01)
*E21B 21/00* (2006.01)
*E21B 21/06* (2006.01)

(52) U.S. Cl.
CPC .............. *C09K 8/12* (2013.01); *E21B 21/003* (2013.01); *E21B 21/065* (2013.01)

(58) Field of Classification Search
None
See application file for complete search history.

(56) References Cited

U.S. PATENT DOCUMENTS

| 5,403,821 A | 4/1995 | Shioji et al. |
| 2007/0259891 A1 | 11/2007 | Wang et al. |
| 2013/0101543 A1 | 4/2013 | Tamareselvy et al. |

(Continued)

FOREIGN PATENT DOCUMENTS

| WO | WO2016137429 | * | 9/1916 | ............... C09K 8/60 |
| WO | WO2016137430 | * | 9/1916 | ............... C09K 8/60 |
| WO | WO2016137433 | * | 9/1916 | ............... C09K 8/60 |

OTHER PUBLICATIONS

Written Opinion of the International Searching Authority for International Application No. PCT/US2015/023565 dated Oct. 16, 2015.

*Primary Examiner* — Angela M DiTrani
(74) *Attorney, Agent, or Firm* — Tenley Krueger Tumey L.L.P.

(57) ABSTRACT

Systems and methods for drilling in a subterranean formation are disclosed. A method comprises providing a drilling fluid, wherein the drilling fluid comprises an aqueous fluid; a first polymer comprising 2-acrylamido-2-methylpropane sulfonic acid, vinylpyrrolidinone, pentaerythritol allyl ether, and methylenebisacrylamide; and a second polymer comprising acrylate, 2-acrylamido-2-methylpropane sulfonic acid, methacrylic acid, and allyloxy 2-hydroxy propane sulfonic acid. The method further comprises placing the drilling fluid into the subterranean formation and drilling a wellbore in the subterranean formation.

20 Claims, 1 Drawing Sheet

(56) References Cited

U.S. PATENT DOCUMENTS

2015/0000985 A1    1/2015  Zhou et al.
2015/0005206 A1    1/2015  Zhou et al.
2016/0376488 A1*  12/2016  Galindo .................. C09K 8/12
                                                    175/65

* cited by examiner

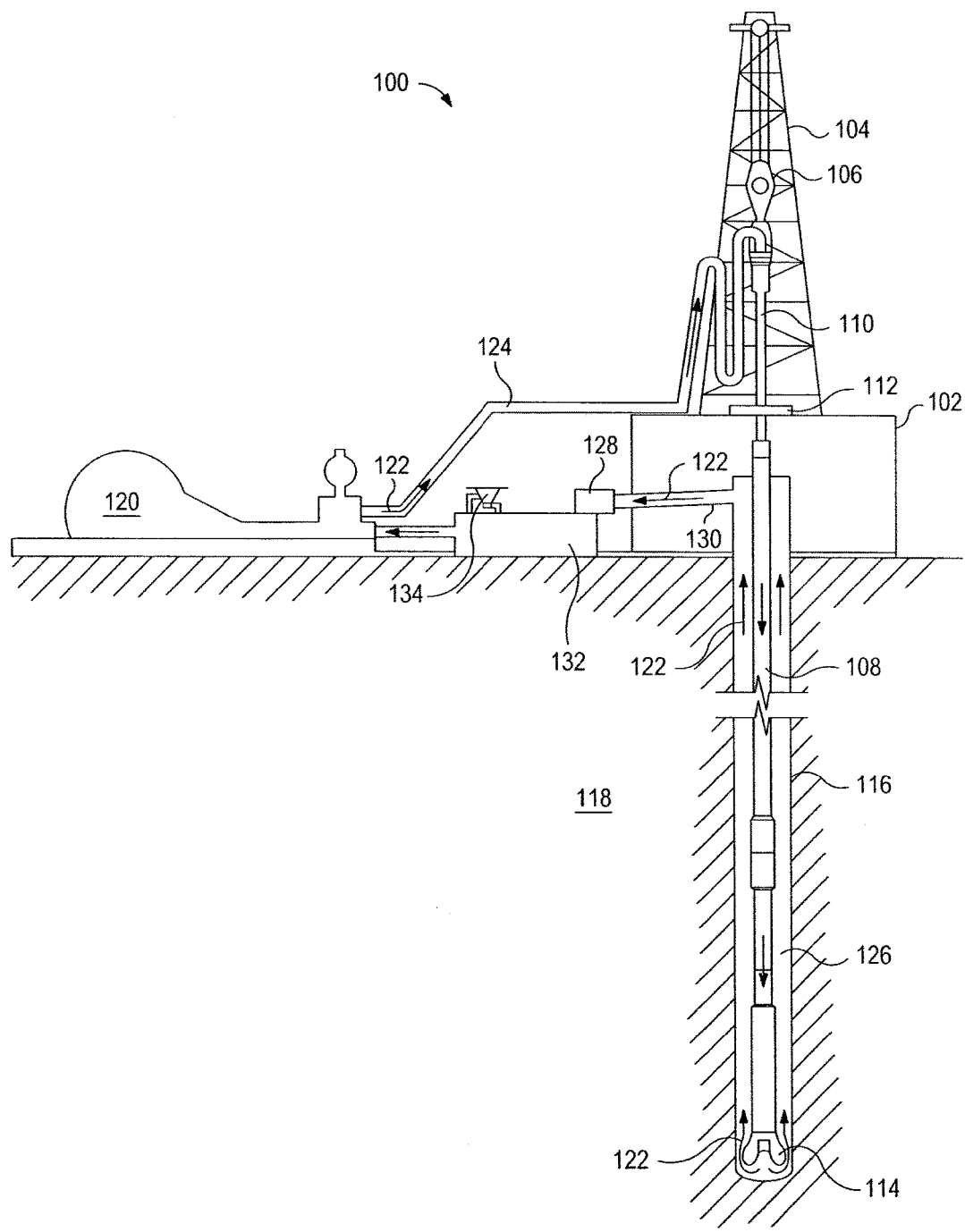

POLYMERIC VISCOSIFIERS FOR USE IN WATER-BASED DRILLING FLUIDS

BACKGROUND

Provided are compositions and methods for a high-temperature water-based drilling fluid. More particularly, compositions and methods may be provided for a water-based mud with low solids, high penetration, and stability at high-temperatures.

During the drilling of a wellbore into a subterranean formation, a drilling fluid, also referred to as a drilling mud, may be continuously circulated from the surface down to the bottom of the wellbore being drilled and back to the surface again. Among other functions, the drilling fluid may serve to transport wellbore cuttings up to the surface, cool the drill bit, and provide hydrostatic pressure on the walls of the drilled wellbore. Drilling fluids may be used in high-temperature formations (e.g., formations having temperatures greater than 325° F.) or formations comprising fractures, voids, thief zones, or other such features through which the drilling fluid may be lost. High temperatures may reduce the effectiveness of a drilling fluid to function as desired by reducing the viscosity of the drilling fluid. For example, a drilling fluid may not sufficiently suspend cuttings at higher temperatures. Furthermore, a less viscous fluid may have increased susceptibility to fluid loss through fractures, voids, thief zones, etc. Viscosifiers may be used to impart the drilling fluids with sufficient viscosity to suspend cuttings and mitigate fluid loss.

To remedy these issues viscosifiers may be added in high concentrations to provide sufficient viscosities. However, high temperatures may also reduce the effectiveness of certain viscosifiers, necessitating the need for higher viscosifier concentrations or the use of other materials such as clays. The viscosifiers may be used with clays in order to achieve a desired viscosity or degree of fluid loss control. However, clay may cause severe formation damage by plugging of the pores of the reservoir formation and may also be difficult to clean-up. As a result of these deficiencies, the drilling industry may have increased expenses and downtime, or in some cases, may avoid drilling in certain formations because operations in such formations are not cost effective due to the increased temperature or presence of fluid loss features.

BRIEF DESCRIPTION OF THE DRAWINGS

These drawings illustrate certain aspects of some examples of the present invention, and should not be used to limit or define the invention.

FIG. 1 is a schematic diagram of an example drilling assembly.

DETAILED DESCRIPTION

Provided are compositions and methods for a high-temperature water-based drilling fluid. More particularly, compositions and methods may be provided for a water-based drilling fluid with low solids, high penetration, and stability at high-temperatures. The drilling fluid may be a water-based mud. The drilling fluids may comprise two different species of polymer viscosifiers. The drilling fluids may be stable in formations having temperatures up to 450° F. The drilling fluids may comprise a low concentration of solids, for example, the drilling fluids may be free of clay or other types of solids which may plug formation zones. The drilling fluids may provide better fluid loss control relative to other water-based drilling fluids. The drilling fluids may provide reduced viscosifier loading relative to other water-based drilling fluids.

The drilling fluids disclosed herein may comprise a combination of at least two viscosifier polymers and an aqueous fluid. In optional examples, weighting agents may be added to the drilling fluids. In further optional examples, the drilling fluids may be substantially free of all solids, for example, clays; with the potential exception of weighting agents if included in the drilling fluids, as well as any solids which may contact the drilling fluids while in use, for example, drill cuttings.

As stated above, the drilling fluids may comprise a combination of at least two viscosifier polymers. The first viscosifying polymer is denoted as Polymer A. Polymer A may comprise the monomers 2-acrylamido-2-methylpropane sulfonic acid and vinylpyrrolidinone; and crosslinkers pentaerythritol allyl ether and methylenebisacrylamide which are illustrated in the structure below as monomers a and b; and crosslinkers c and d respectively.

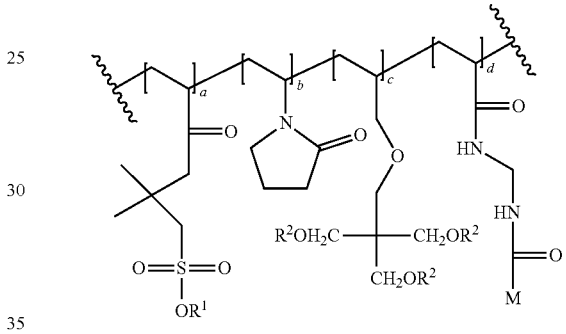

The monomers and crosslinkers may occur in any configuration in Polymer A and may be repeated with any frequency. In regards to monomer A, at each occurrence $R^1$ is independently selected from the group consisting of —H and a counterion. In regards to crosslinker c, at each occurrence, $R^2$ may be a tri-, di-, or monoallyl ether. If $R^2$ is not substituted with an allyl group, it exists as the alcohol. With reference to the $R^2$ and M functional groups of crosslinkers c and d respectively, functional groups $R^2$ and M may crosslink with other functional groups to link the polymer chain comprising crosslinkers c and d to another polymer chain. A "crosslink" refers herein to a bond linking one monomer or polymer chain to another polymer chain. The bond may be any bond, for example, covalent bond, ionic bond, and the like. A "crosslinker" is defined herein as comprising two or more olefinic bonds. Polymer A may comprise monomer a in an amount of has about 50 mol % to about 98 mol %. Polymer A may comprise monomer b in an amount of about 1 mol % to about 40 mol %. Polymer A may comprise crosslinker c in an amount of about 0.1 mol % to about 15 mol %. Polymer A may comprise crosslinker d in an amount of about 0.1 mol % to about 15 mol %. The drilling fluid may comprise Polymer A in an amount of about 0.1% to about 15% by weight of the drilling fluid. For example, the drilling fluid may comprise Polymer A in an amount of between about 0.1% to about 6% by weight of the drilling fluid or alternatively about 0.1% to about 3% by weight of the drilling fluid. With the benefit of this disclosure, one of ordinary skill in the art should be able to select a concentration of Polymer A for the drilling fluid disclosed herein.

As discussed above, the drilling fluids may comprise a combination of at least two viscosifier polymers. The second viscosifying polymer is denoted as Polymer B. Polymer B may comprise a tetrapolymer of acrylate, 2-acrylamido-2-methylpropane sulfonic acid, methacrylic acid. and allyloxy 2-hydroxy propane sulfonic acid monomers. Polymer B may comprise the monomers in any configuration and the monomers may be repeated with any frequency. Polymer B may or may not be crosslinked as desired. If crosslinking of Polymer B is desirable, crosslinkers such as crosslinker c and crosslinker d, as described above in regards to Polymer A, may be used to crosslink Polymer B as desired. For example, crosslinker c and crosslinker d may be added to Polymer B during the polymerization of Polymer B. Additionally, other crosslinkers sufficient for use with Polymer B may be used as would occur to one of ordinary skill in the art. Alternatively. and as discussed above. Polymer B may not be crosslinked if desired. The drilling fluid may comprise Polymer B in an amount between about 0.1% to about 10% by weight of the drilling fluid. For example, the drilling fluid may comprise Polymer B in an amount between about 0.1% to about 6% by weight of the drilling fluid or alternatively about 0.1% to about 3% by weight of the drilling fluid. With the benefit of this disclosure, one of ordinary skill in the art should be able to select a concentration of Polymer B for the drilling fluids disclosed herein.

Polymer A and Polymer B may be included in the drilling fluids in a ratio of about 5:1 to about 1:5 respectively. For example, Polymer A and Polymer B may be included in the drilling fluids in a ratio of about 4:1, about 3:1, about 3:2, about 2:1, about 1:1, about 1:2, about 2:3, about 1:3, or about 1:4. With the benefit of this disclosure, one of ordinary skill in the art will be able to select a ratio of Polymer A to Polymer B for the disclosed drilling fluids. It should be understood that ratios of Polymer A and Polymer B outside those specifically listed in this application may also be used as deemed appropriate by those of ordinary skill in the art.

The drilling fluids may comprise an aqueous fluid. The aqueous fluid may be from any source provided that it does not contain an excess of compounds that may undesirably affect other components in the drilling fluids. For example, a drilling fluid may comprise fresh water or salt water. Salt water generally may include one or more dissolved salts therein and may be saturated or unsaturated as desired for a particular application. Seawater or brines may be suitable for use in some examples. Further, the aqueous fluid may be present in an amount sufficient to form a pumpable slurry. In certain examples, the aqueous fluid may be present in the drilling fluids in an amount in the range of from about 33% to about 100% by weight of the drilling fluids. In certain examples, the aqueous fluid may be present in the drilling fluids in an amount in the range of from about 35% to about 70% by weight of the drilling fluids. One of ordinary skill in the art with the benefit of this disclosure will recognize the appropriate amount of aqueous fluid for a chosen application.

The drilling fluids may additionally comprise drilling fluid additives, which may include viscosifiers, shale stabilizers, emulsifiers, wetting agents, weighting agents, etc. As discussed above, the drilling fluids may be substantially free of solids. Alternatively, in some examples, the drilling fluid may comprise solids. The solids may be any type of solids found in a wellbore or introduced into a wellbore fluid. Without limitation, examples of solids may include pieces of the formation, drill cuttings, and additives introduced to a drilling fluid, e.g., lost circulation materials, weighting agents, etc. Suitable examples of weighting agents include, for example, materials having a specific gravity of 2 or greater, such as barite.

As stated above, one or more additional viscosifiers may be added to the drilling fluids, these additional viscosifiers will be referred to as tertiary viscosifiers. As such, the drilling fluids can further include a tertiary viscosifier, in addition to Polymer A and Polymer B. The tertiary viscosifier may be present in any suitable concentration, such as more, less, or an equal concentration as compared to the concentration of Polymer A and/or Polymer B. The tertiary viscosifier can include at least one of a substituted or unsubstituted polysaccharide, and a substituted or unsubstituted polyalkenylene, wherein the substituted or unsubstituted polysaccharide or polyalkenylene is crosslinked or uncrosslinked. The tertiary viscosifier can include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The tertiary viscosifier can include a crosslinked gel or a crosslinkable gel.

The tertiary viscosifier can affect the viscosity of the drilling fluid at any suitable time and location. In some examples, the tertiary viscosifier may provide an increased viscosity at least one of before placement in the subterranean formation, at the time of placement into the subterranean formation, during travel to and through a subterranean formation, once the drilling fluid reaches a particular location in a subterranean formation, or some period of time after the drilling fluid reaches a particular location in a subterranean formation. In some examples, the tertiary viscosifier may provide some or no increased viscosity until the tertiary viscosifier reaches a desired location in a subterranean formation, at which point the tertiary viscosifier may provide a small or large increase in viscosity.

In some examples, the tertiary viscosifier may include at least one of a linear polysaccharide, and poly(($C_2$-$C_{10}$)alkenylene), wherein at each occurrence, the ($C_2$-$C_{10}$)alkenylene is independently substituted or unsubstituted. In some examples, the tertiary viscosifier can include at least one of poly(acrylic acid) or ($C_1$-$C_5$)alkyl esters thereof, poly(methacrylic acid) or ($C_1$-$C_5$)alkyl esters thereof, poly (vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (e.g., hydroxypropyl guar, carboxy methyl guar, or carboxymethyl hydroxylpropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxyl ethyl cellulose).

In some examples, the tertiary viscosifier may include a poly(vinyl alcohol) homopolymer, poly(vinyl alcohol) copolymer, a crosslinked poly(vinyl alcohol) homopolymer, and a crosslinked poly(vinyl alcohol) copolymer. The tertiary viscosifier may include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The tertiary viscosifier may include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The tertiary viscosifier may include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The tertiary viscosifier may include a poly(vinyl alcohol) copolymer or a crosslinked poly(vinyl alcohol) copolymer including at least one of a graft, linear, branched, block, and random copolymer that includes a poly(vinylalcohol)-poly(acrylamide) copolymer, a poly(vinylalcohol)-poly(2-acrylamido-2-methylpropanesulfonic acid) copolymer, or a poly(vinylalcohol)-poly(N-vinylpyrrolidone) copolymer. The tertiary viscosifier may include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The tertiary viscosifier may include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin. The drilling fluids may include any suitable proportion of the tertiary viscosifier, such as about 0.001 wt % to 99.99 wt %, about 0.01 wt % to about 99 wt %, about 0.1 wt % to about 50 wt %, or about 0.1 wt % to about 20 wt % or more of the drilling fluid.

Weighting agents may be included in the drilling fluids. Weighting agents are typically materials that weigh more than water and may be used to increase the density of drilling fluids. By way of example, weighting agents may have a specific gravity of about 2 or higher (e.g., about 2, about 4, etc.). Examples of weighting agents that may be used include, but are not limited to, hematite, illmenite, hausmannite, barite, and combinations thereof. Specific examples of suitable weighting agents include HI-DENSE® weighting agent, available from Halliburton Energy Services, Inc.

The drilling fluids may be substantially free or free of added clays. "Added" clays are defined herein as clays added to the drilling fluids prior to introduction of the drilling fluids in a subterranean formation. Examples of added clays may include, but are not limited to montmorillonite, kaolite, or hectorite. In some examples, the drilling fluids may consist essentially of Polymer A, Polymer B, and an aqueous fluid. One of ordinary skill in the art with the benefit of this disclosure will recognize whether the drilling fluids should be free of or substantially free of added clays.

The drilling fluids may be used in subterranean formations having a high temperature, for example, the subterranean formation may comprise a temperature greater than 325° F. As a further example, the drilling fluids may be used in subterranean formations comprising temperatures greater than about 350° F. greater than about 375° F., greater than about 400° F., greater than about 425° F. or greater than about 450° F.

A method for drilling in a subterranean formation is disclosed. The method may comprise providing a drilling fluid, wherein the drilling fluid comprises an aqueous fluid; a first polymer comprising 2-acrylamido-2-methylpropane sulfonic acid, vinylpyrrolidinone, pentaerythritol allyl ether, and methylenebisacrylamide; and a second polymer comprising acrylate, 2-acrylamido-2-methylpropane sulfonic acid, methacrylic acid, and allyloxy 2-hydroxy propane sulfonic acid: placing the drilling fluid into the subterranean formation; and drilling a wellbore in the subterranean formation. The 2-acrylamido-2-methylpropane sulfonic acid may be present in the first polymer in an amount of about 50 mol % to about 98 mol %, the vinylpyrrolidinone may be present in the first polymer in an amount of about 1 mol % to about 40 mol %, the pentaerythritol allyl ether may be present in the first polymer an amount of about 0.1 mol % to about 15 mol %, and the methylenebisacrylamide may be present in the first polymer in an amount of about 0.1 mol % to about 15 mol %. The drilling fluid may comprise the first polymer in an amount of about 0.1% to about 15% by weight of the drilling fluid. The drilling fluid may comprise the second polymer in an amount of about 0.1% to about 10% by weight of the drilling fluid. The ratio of the first polymer to the second polymer may be in a range of about 5:1 to about 1:5. The aqueous fluid may be present in the drilling fluid in an amount in the range of from about 33% to about 100% by weight of the drilling fluid. The first polymer may be a crosslinked polymer. The drilling fluid may further comprise a weighting agent. The drilling fluid may be substantially free of clay. The subterranean formation may have a temperature greater than 325° F.

A composition for a drilling fluid is disclosed. The composition may comprise an aqueous fluid; a first polymer comprising 2-acrylamido-2-methylpropane sulfonic acid, vinylpyrrolidinone, pentaerythritol allyl ether, and methylenebisacrylamide; and a second polymer comprising acrylate, 2-acrylamido-2-methylpropane sulfonic acid, methacrylic acid, and allyloxy 2-hydroxy propane sulfonic acid. The 2-acrylamido-2-methylpropane sulfonic acid may be present in the first polymer in an amount of about 50 mol % to about 98 mol %, the vinylpyrrolidinone may be present in the first polymer in an amount of about 1 mol % to about 40 mol %, the pentaerythritol allyl ether may be present in the first polymer an amount of about 0.1 mol % to about 15 mol %, and the methylenebisacrylamide may be present in the first polymer in an amount of about 0.1 mol % to about 15 mol %. The drilling fluid may comprise the first polymer in an amount of about 0.1% to about 15% by weight of the drilling fluid. The drilling fluid may comprise the second polymer in an amount of about 0.1% to about 10% by weight of the drilling fluid. The ratio of the first polymer to the second polymer may be in a range of about 5:1 to about 1:5. The aqueous fluid may be present in the drilling fluid in an amount in the range of from about 33% to about 100% by weight of the drilling fluid. The first polymer may be a crosslinked polymer. The drilling fluid may further comprise a weighting agent. The drilling fluid may be substantially free of clay.

A drilling system is disclosed. The drilling system may comprise a drilling fluid comprising an aqueous fluid: a first polymer comprising 2-acrylamido-2 methylpropane sulfonic acid, vinylpyrrolidinone, pentaerythritol allyl ether, and methylenebisacrylamide; and a second polymer comprising acrylate, 2-acrylamido-2 methylpropane sulfonic acid, methacrylic acid, and allyloxy 2-hydroxy propane sulfonic acid; a drilling assembly; a drill string coupled to the drilling assembly; a pumping system fluidically coupled to the drill string, wherein the pumping system is capable of pumping the drilling fluid through the drill string. The 2-acrylamido-2-methylpropane sulfonic acid may be present in the first polymer in an amount of about 50 mol % to about 98 mol %, the vinylpyrrolidinone may be present in the first polymer in an amount of about 1 mol % to about 40 mol %, the pentaerythritol allyl ether may be present in the first polymer an amount of about 0.1 mol % to about 15 mol %, and the methylenebisacrylamide may be present in the first polymer in an amount of about 0.1 mol % to about 15 mol %. The drilling fluid may comprise the first polymer in an amount of about 0.1% to about 15% by weight of the drilling fluid. The drilling fluid may comprise the second polymer in an amount of about 0.1% to about 10% by weight of the drilling fluid. The ratio of the first polymer to the second polymer may be in a range of about 5:1 to about 1:5. The aqueous fluid may be present in the drilling fluid in an amount in the range of from about 33% to about 100% by weight of the drilling fluid. The first polymer may be a crosslinked polymer. The drilling fluid may further comprise a weighting agent. The drilling fluid may be substantially free of clay.

FIG. 1 illustrates an example drilling assembly 100 in which a drilling fluid 122 as disclosed above (i.e., a drilling fluid comprising Polymer A and Polymer B) may be used. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118.

Drilling fluid 122 comprising an aqueous fluid, Polymer A, and Polymer B may be prepared. A pump 120 (e.g., a mud pump) may circulate drilling fluid 122 through a feed pipe 124 and to the kelly 110, which conveys the drilling fluid 122 downhole through the interior of the drill string 108 and through one or more orifices in the drill bit 114. The drilling fluid 122 may then be circulated back to the surface via an annulus 126 defined between the drill string 108 and the walls of the wellbore 116. At the surface, the recirculated or spent drilling fluid 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid.

After passing through the fluid processing unit(s) 128, a "cleaned" drilling fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more of the drilling fluid additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drilling fluid 122 at any other location in the drilling assembly 100. While FIG. 1 shows only a single retention pit 132, there could be more than one retention pit 132, such as multiple retention pits 132 in series. Moreover, the retention pit 132 may be representative of one or more fluid storage facilities and/or units where the drilling fluid additives may be stored, reconditioned, and/or regulated until added to the drilling fluid 122.

The exemplary drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary drilling fluids. The disclosed drilling fluids may also directly or indirectly affect any transport or delivery equipment used to convey the drilling fluids to a well site or downhole such as, for example, any transport vessels. conduits, pipelines, trucks, tubulars, and/or pipes used to compositionally move the drilling fluids from one location to another, any pumps, compressors, or motors (e.g., topside or downhole) used to drive the drilling fluids into motion, any valves or related joints used to regulate the pressure or flow rate of the drilling fluids, and any sensors (i.e., pressure and temperature), gauges, and/or combinations thereof, and the like. The disclosed drilling fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the disclosure, the following examples of certain aspects of some embodiments are given. In no way should the following examples be read to limit, or define, the entire scope of the embodiments.

Example 1

The following series of tests were performed to evaluate the rheology and filtration control of comparative drilling fluids comprising Polymer A and Polymer B. Five different comparative sample drilling fluids, designated Samples 1-5, were prepared using at least some of the following components as indicated in Table 1 below: tap water, sodium bicarbonate, soda ash, sodium hydroxide, potassium chloride, a rheology modifier (BDF™-678 rheology modifier, available from Halliburton Energy Services, Inc., Houston, Tex.). Polymer A, Polymer B, a drilling fluid thinner (THERMA-THIN® Thinner, available from Halliburton Energy Services, Inc., Houston, Tex.), barite weighting agent, and a wetting agent (AQUATONE-S™ vetting agent, available from Halliburton Energy Services, Inc., Houston, Tex.). The formulations of the sample drilling fluids are provided in Table 1 below.

TABLE 1

Sample Formulations

| 14.0 lb/gal Formulation | 1 | 2 | 3 | 4 | 5 |
|---|---|---|---|---|---|
| Tap water, bbl* | 0.79 | 0.79 | 0.79 | 0.79 | 0.79 |
| Sodium Bicarbonate, lb/bbl** | 1.7 | 4.0 | 4.0 | 1.7 | 4.0 |
| Soda Ash, lb/bbl | 10.6 | — | — | 10.6 | — |
| Sodium Hydroxide, lb/bbl | — | 0.5 | 0.5 | — | 0.5 |
| Potassium Chloride, lb/bbl | — | 2.0 | 8.0 | — | 8.0 |
| Rheology Modifier, lb/bbl | — | — | 1.0 | — | 0.2 |
| Drilling Fluid Thinner, lb/bbl | 3.0 | — | 3.0 | 3.0 | 3.0 |
| Weighting Agent, lb/bbl | 311.0 | 311.0 | 311.0 | 311.0 | 311.0 |
| Wetting Agent, lb/bbl | — | — | — | 6.0 | 6.0 |
| Polymer A, lb/bbl | — | 4.0 | 7.0 | 2.0 | 2.0 |
| Polymer B, lb/bbl | 2.1 | — | — | 2.1 | 2.1 |

*bbl = 42 gallons; lab equivalent = 350 mL
**1 lb/bbl = lab equivalent of 1 g/350 mL After preparation, the viscosities of the five samples were determined at 120° F. using a Model 35A FANN® Viscometer, in accordance with the procedure set forth in API RP Practice 13B-1, *Recommended Practice for Field Testing of Water-Based Drilling Fluids*. After testing the viscosity, the fluid sample was then aged to provide comparative data on changes in the fluid over time. Additionally, the plastic viscosity, yield point, and the amount of filtrate were measured. The data is presented in Table 2 below.

TABLE 2

| 14.0 lb/gal Formulation | 1 | | 2 | | 3 | | | 4 | | 5 | | |
|---|---|---|---|---|---|---|---|---|---|---|---|---|
| Viscosity Tests |||||||||||||
| Static Aging Conditions ° F. | — | 400 | — | 400 | — | 400 | 400 | — | 400 | — | 400 | 400 |
| Aging Time, Hours | — | 16 | — | 16 | — | 16 | 48 | — | 48 | — | 16 | 36 |
| Viscosity Measurements |||||||||||||
| 600 RPM | 51 | 75 | 78 | 104 | 98 | 82 | 78 | 99 | 106 | 100 | 98 | 101 |
| 300 RPM | 38 | 56 | 57 | 71 | 60 | 49 | 51 | 67 | 72 | 69 | 61 | 63 |
| 200 RPM | 33 | 48 | 47 | 57 | 49 | 39 | 38 | 55 | 58 | 54 | 47 | 49 |
| 100 RPM | 27 | 40 | 36 | 40 | 33 | 26 | 24 | 41 | 40 | 36 | 30 | 32 |
| 6 RPM | 16 | 20 | 20 | 17 | 11 | 7 | 6 | 17 | 9 | 10 | 8 | 9 |
| 3 RPM | 15 | 18 | 19 | 16 | 9 | 6 | 5 | 16 | 7 | 9 | 6 | 7 |
| Fluid Properties |||||||||||||
| Plastic Viscosity, cP | 13 | 19 | 25 | 21 | 38 | 33 | 27 | 32 | 34 | 36 | 37 | 38 |
| Yield Point, lb/100 ft$^2$ | 25 | 37 | 47 | 32 | 22 | 16 | 24 | 35 | 38 | 33 | 24 | 25 |
| Filtrate collected at 350° F., mL | — | 57.0 | — | 32.0 | — | 16.0 | 16.0 | — | 19.0 | — | 21.0 | 22.4 |

Example 1 thus indicates that the combination of Polymer A and Polymer B provides the best rheology, filtrate control, and polymer loading concentrations relative to the other formulations. In sample 3, the use of Polymer A provided good filtrate control, but required a loading of 7 lb/bbl to achieve the result. When paired with Polymer B a similar level of filtrate control can be achieved with only a loading of 2.0 lb/bbl for Polymer A.

Example 2

The following comparative formulations were carried out to evaluate whether Polymer B had synergistic effects with other polymers. The results are indicated in Table 3 below.

TABLE 3

Polymer B Formulation Pairings

| Polymer B paired with polymer: | Result: | Reason: |
|---|---|---|
| Low molecular weight crosslinked acrylamide terpolymer | No synergistic effect | Viscosity too high; fluid loss too great |
| Vinyl sulfonate/vinyl lactam copolymer | No synergistic effect | Viscosity too high; fluid loss too great |
| Poly(sodium 4-styrene sulfonate) | No synergistic effect | Fluid loss too great |
| Acrylamide terpolymer | No synergistic effect | Viscosity too high |
| Sulfonated, hydroxylated organic polymer | No synergistic effect | Viscosity too high; fluid loss too great |
| 2-acrylamido-2-methylpropane sulfonic acid/acrylamide/acrylic acid/polyphosphonic acid, ammonium salt | No synergistic effect | Viscosity too high |
| 2-acrylamido-2-methylpropane sulfonic acid/acrylamide/acrylic acid/polyphosphonic acid, sodium salt | No synergistic effect | Fluid loss too great |
| <1,000,000 molecular weight N,N-dimethyl acrylamide/AMSA copolymer | No synergistic effect | Viscosity too high; fluid loss too great |
| 2-acrylamido-2-methylpropane sulfonic acid/acrylamide copolymer | No synergistic effect | Viscosity too high; fluid loss too great |
| 2-acrylamido-2-methylpropane sulfonic acid/acrylamide/pyrrolidone polymer | No synergistic effect | Viscosity too high |

As shown, Polymer B did not have synergistic effects with any of the disclosed polymers.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for drilling in a subterranean formation:
providing a drilling fluid, wherein the drilling fluid comprises an aqueous fluid; a first polymer comprising 2-acrylamido-2-methylpropane sulfonic acid, vinylpyrrolidinone, pentaerythritol allyl ether, and methylenebisacrylamide; and a second polymer comprising acrylate, 2-acrylamido-2-methylpropane sulfonic acid, methacrylic acid, and allyloxy 2-hydroxy propane sulfonic acid;
placing the drilling fluid into the subterranean formation; and
drilling a wellbore in the subterranean formation.

2. The method of claim 1 wherein the 2-acrylamido-2-methylpropane sulfonic acid is present in the first polymer in an amount of about 50 mol % to about 98 mol %, wherein the vinylpyrrolidinone is present in the first polymer in an amount of about 1 mol % to about 40 mol %, wherein the pentaerythritol allyl ether is present in the first polymer an amount of about 0.1 mol % to about 15 mol %, and wherein the methylenebisacrylamide is present in the first polymer in an amount of about 0.1 mol % to about 15 mol %.

3. The method of claim 1 wherein the drilling fluid comprises the first polymer in an amount of about 0.1% to about 15% by weight of the drilling fluid.

4. The method of claim 1 wherein the drilling fluid comprises the second polymer in an amount of about 0.1% to about 10% by weight of the drilling fluid.

5. The method of claim 1 wherein the ratio of the first polymer to the second polymer is in a range of about 5:1 to about 1:5.

6. The method of claim 1 wherein the aqueous fluid is present in the drilling fluid in an amount in the range of from about 33% to about 100% by weight of the drilling fluid.

7. The method of claim 1 wherein the first polymer is a crosslinked polymer.

8. The method of claim 1 wherein the drilling fluid further comprises a weighting agent.

9. The method of claim 1 wherein the drilling fluid is substantially free of clay.

10. The method of claim 1 wherein the subterranean formation has a temperature greater than 325° F.

11. A drilling fluid comprising:
an aqueous fluid;
a first polymer comprising 2-acrylamido-2-methylpropane sulfonic acid, vinylpyrrolidinone, pentaerythritol allyl ether, and methylenebisacrylamide; and
a second polymer comprising acrylate, 2-acrylamido-2-methylpropane sulfonic acid, methacrylic acid, and allyloxy 2-hydroxy propane sulfonic acid.

12. The drilling fluid of claim 11 wherein the 2-acrylamido-2-methylpropane sulfonic acid is present in the first polymer in an amount of about 50 mol % to about 98 mol %, wherein the vinylpyrrolidinone is present in the first polymer in an amount of about 1 mol % to about 40 mol %, wherein the pentaerythritol allyl ether is present in the first polymer an amount of about 0.1 mol % to about 15 mol %, and wherein the methylenebisacrylamide is present in the first polymer in an amount of about 0.1 mol % to about 15 mol %.

13. The drilling fluid of claim 11 wherein the drilling fluid comprises the first polymer in an amount of about 0.1% to about 15% by weight of the drilling fluid.

14. The drilling fluid of claim 11 wherein the drilling fluid comprises the second polymer in an amount of about 0.1% to about 10% by weight of the drilling fluid.

15. The drilling fluid of claim 11 wherein the ratio of the first polymer to the second polymer is in a range of about 5:1 to about 1:5.

16. The drilling fluid of claim 11 wherein the first polymer is a crosslinked polymer.

17. The drilling fluid of claim 11 wherein the drilling fluid is substantially free of clay.

18. A drilling system comprising:
a drilling fluid comprising an aqueous fluid; a first polymer comprising 2-acrylamido-2-methylpropane sulfonic acid, vinylpyrrolidinone, pentaerythritol allyl ether, and methylenebisacrylamide; and a second polymer comprising acrylate, 2-acrylamido-2-methylpropane sulfonic acid, methacrylic acid, and allyloxy 2-hydroxy propane sulfonic acid;
a drilling assembly;
a drill string coupled to the drilling assembly;
a pumping system fluidically coupled to the drill string, wherein the pumping system is capable of pumping the drilling fluid through the drill string.

19. The drilling system of claim 18 wherein the 2-acrylamido-2-methylpropane sulfonic acid is present in the first polymer in an amount of about 50 mol % to about 98 mol %, wherein the vinylpyrrolidinone is present in the first polymer in an amount of about 1 mol % to about 40 mol %, wherein the pentaerythritol allyl ether is present in the first polymer an amount of about 0.1 mol % to about 15 mol %, and wherein the methylenebisacrylamide is present in the first polymer in an amount of about 0.1 mol % to about 15 mol %.

20. The drilling system of claim 18 wherein drilling fluid comprises the first polymer in an amount of about 0.1% to about 15% by weight of the drilling fluid and wherein the drilling fluid comprise the second polymer in an amount of about 0.1% to about 10% by weight of the drilling fluid.

* * * * *